United States Patent
Liu et al.

(10) Patent No.: US 9,111,112 B2
(45) Date of Patent: Aug. 18, 2015

(54) COMPUTER APPARATUS AND CONTROL METHOD FOR OPTICAL DISK DRIVE THEREOF

(71) Applicant: Wistron Corporation, New Taipei (TW)

(72) Inventors: Wei-Wei Liu, New Taipei (TW); Qian Ma, New Taipei (TW)

(73) Assignee: Wistron Corporation, New Taipei (TW)

( * ) Notice: Subject to any disclaimer, the term of this patent is extended or adjusted under 35 U.S.C. 154(b) by 10 days.

(21) Appl. No.: 14/155,310

(22) Filed: Jan. 14, 2014

(65) Prior Publication Data

US 2015/0089672 A1    Mar. 26, 2015

(30) Foreign Application Priority Data

Sep. 24, 2013    (CN) .......................... 2013 1 0459472

(51) Int. Cl.
*H04L 29/06*    (2006.01)
*G06F 21/62*    (2013.01)

(52) U.S. Cl.
CPC .................................. *G06F 21/6218* (2013.01)

(58) Field of Classification Search
CPC ..... G06F 21/10; G06F 21/6218; G06F 21/44; H04L 63/10; H04L 63/08
See application file for complete search history.

(56) References Cited

U.S. PATENT DOCUMENTS

| | | | |
|---|---|---|---|
| 6,449,737 B1 * | 9/2002 | Tanaka et al. ................. | 714/38.1 |
| 6,792,536 B1 * | 9/2004 | Teppler .......................... | 713/178 |
| 7,756,535 B1 * | 7/2010 | Diao et al. .................... | 455/466 |
| 8,402,543 B1 * | 3/2013 | Ranjan et al. .................. | 726/23 |
| 8,505,094 B1 * | 8/2013 | Xuewen et al. ................ | 726/22 |
| 8,682,812 B1 * | 3/2014 | Ranjan .......................... | 706/12 |
| 8,695,092 B2 * | 4/2014 | Manianchira et al. .......... | 726/22 |
| 9,032,516 B2 * | 5/2015 | Kim et al. ..................... | 726/22 |
| 2004/0037174 A1 | 2/2004 | Uchida et al. | |
| 2007/0130350 A1 * | 6/2007 | Alperovitch et al. ......... | 709/229 |
| 2007/0192593 A1 * | 8/2007 | Boisjolie et al. .............. | 713/162 |
| 2007/0192855 A1 * | 8/2007 | Hulten et al. .................. | 726/22 |
| 2012/0158626 A1 * | 6/2012 | Zhu et al. ...................... | 706/13 |
| 2012/0227104 A1 * | 9/2012 | Sinha et al. .................... | 726/22 |

OTHER PUBLICATIONS

D. Mills, "Simple Network Time Protocol (SNTP) Version 4 for IPva, IPv6, and OSI", Oct. 1996.*
Tom, "System Tool <<URC Access Modes>> for locking storage device in order to prevent computer data from being taken away with ease," Jan. 30, 2013, available at : http://steachs.com/archives/3049.
Shareblog, "CD DVD Locker for locking optical drive tray in order to prevent accidental ejecting out and affecting the work," Mar. 3, 2009, available at : http://shareblog.mysinablog.com/index.php?op=ViewArticle&articleId=1604056.
"Office Action of Taiwan Counterpart Application" with partial translation, issued on Mar. 27, 2015, p. 1-p. 15, in which the listed references were cited.

* cited by examiner

*Primary Examiner* — Yonas Bayou
(74) *Attorney, Agent, or Firm* — Jianq Chyun IP Office

(57) ABSTRACT

A computer apparatus and a control method for the ODD are disclosed. The control method includes: providing a user setting interface by the computer apparatus when the computer apparatus is in a user mode; receiving a user instruction through the user setting interface so as to start or close an ODD safety protection mode; and deciding whether or not a position state of a tray of the ODD can be changed according to that whether or not the ODD safety protection mode is started and whether or not the computer apparatus is in the user mode.

14 Claims, 4 Drawing Sheets

COMPUTER APPARATUS AND CONTROL METHOD FOR OPTICAL DISK DRIVE THEREOF

CROSS-REFERENCE TO RELATED APPLICATION

This application claims the priority benefit of China application serial no. 201310459472.9, filed on Sep. 24, 2013. The entirety of the above-mentioned patent application is hereby incorporated by reference herein and made a part of this specification.

BACKGROUND OF THE INVENTION

1. Field of the Invention

The present invention generally relates to a computer apparatus, and more particularly, to a control method for optical disk drive (ODD) of a computer apparatus.

2. Description of Related Art

In today's computer apparatuses, in order to prevent others from stealing data in the computer apparatus, a password is normally set by the system user so as to make the computer apparatus log in a user mode. However, when a computer apparatus has turned on the power supply thereof but is not been in user mode, the tray of the ODD of the computer apparatus still can be turned on by pressing a button on the ODD. In this case, interested parties can insert an optic disk with a virus or a backdoor program into the ODD in advance, so that when a user of the computer apparatus logs in user mode, an unexpected loss may occur through taking the data of the computer apparatus or destroying the data of the computer apparatus by automatically executing the virus and/or the backdoor program contained in the optical disk.

SUMMARY OF THE INVENTION

Accordingly, the present invention is directed to a computer apparatus and a control method for the ODD thereof which are able to effectively prevent others from intruding into the computer apparatus via the ODD thereof.

The control method for the ODD of a computer apparatus includes: providing a user setting interface by the computer apparatus when the computer apparatus is in a user mode; receiving a user instruction through the user setting interface so as to start or close an ODD safety protection mode; and deciding whether or not a position state of a tray of the ODD can be changed according to that whether or not the ODD safety protection mode is started and whether or not the computer apparatus is in the user mode.

In an embodiment of the present invention, when the above-mentioned step of providing the user setting interface by the computer apparatus when the computer apparatus is in the user mode includes: executing a safety mode setting application by the computer apparatus to provide the user setting interface so as to receive the user instruction.

In an embodiment of the present invention, the above-mentioned step of receiving the user instruction through the user setting interface so as to start or close the ODD safety protection mode includes: providing at least one virtual image through the user setting interface; and receiving the user instruction through the virtual image so as to start or close the ODD safety protection mode.

In an embodiment of the present invention, the above-mentioned control method for the ODD of a computer apparatus further includes: receiving a user login password input by a user so that the computer apparatus enters the computer apparatus user mode.

In an embodiment of the present invention, the position state of the tray of the ODD can be changed when the computer apparatus enters the user mode.

In an embodiment of the present invention, the position state of the tray of the ODD is unable to be changed when the computer apparatus does not enter the user mode and the ODD safety protection mode is started.

In an embodiment of the present invention, the position state of the tray of the ODD is able to be changed when the computer apparatus does not enter the user mode and the ODD safety protection mode is closed.

In an embodiment of the present invention, the above-mentioned position state includes that the tray is loaded and the tray is ejected.

The computer apparatus of the invention includes an ODD and a controller. The ODD has a tray. The controller is coupled to the ODD, in which when the computer apparatus is in a user mode, the controller provides a user setting interface and receives a user instruction through the user setting interface so as to start or close an ODD safety protection mode, in which the controller produces a control signal according to that whether or not the ODD safety protection mode is started and whether or not the computer apparatus is in the user mode, and the ODD decides whether or not a position state of the tray of the ODD can be changed according to the control signal.

In an embodiment of the present invention, the above-mentioned ODD includes a driving circuit and an actuator. The driving circuit is coupled to the controller, receives the control signal and judges whether or not to produce a driving signal according to the control signal. The actuator is coupled to the driving circuit and the tray, receives the driving signal and changes the position state of the tray according to the driving signal.

Based on the depiction above, the computer apparatus provides the user setting interface to allow the user starting the ODD safety protection mode, through which when the computer apparatus is in a non-user mode, the tray of the OOD is unable to change the position state thereof. In this way, the data in the computer apparatus is unable to be stolen and/or destroyed through accessing the OOD by others, which effectively ensures the data safety of the computer apparatus.

In order to make the features and advantages of the present invention more comprehensible, the present invention is further described in detail in the following with reference to the embodiments and the accompanying drawings.

DESCRIPTION OF THE EMBODIMENTS

Figure 1:
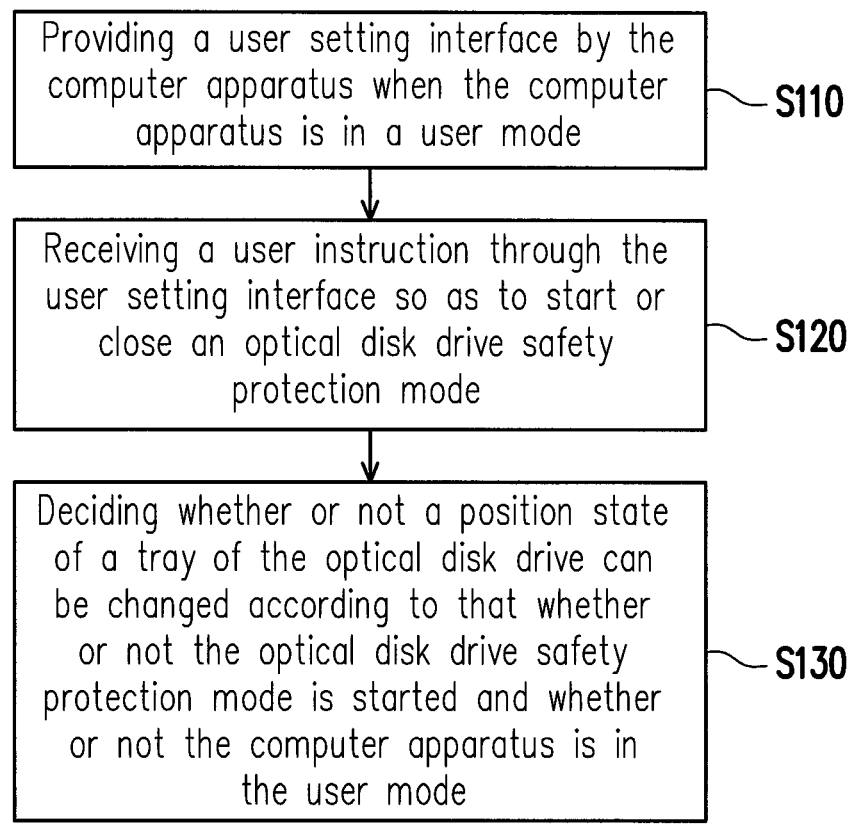
FIG. 1 is a flowchart of a control method for the ODD of a computer apparatus according to an embodiment of the invention.

FIG. 1 is a flowchart of a control method for the ODD of a computer apparatus according to an embodiment of the invention. Referring to FIG. 1, in step S110, when the computer apparatus is in a user mode, the computer apparatus can provide a user setting interface, and in step S120, the computer apparatus can receive a user instruction through the provided user setting interface, followed by starting or closing an ODD safety protection mode through the user instruction. The user setting interface can be provided by the computer apparatus to executing an application. When the computer apparatus is in the user mode, the user can produce the user setting interface through executing a specific application.

Figure 2A:
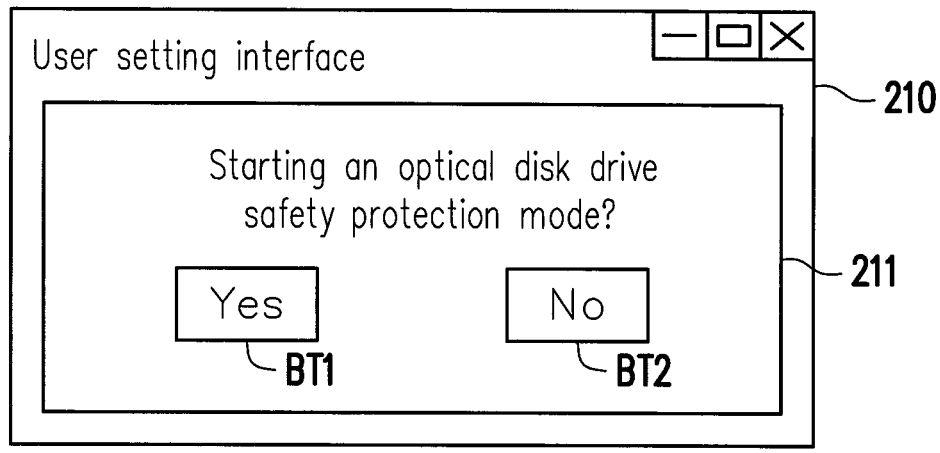
FIG. 2A is a diagram illustrating an implementation of the user setting interface according to an embodiment of the invention.

FIGS. 2A and 1 are referred to, wherein FIG. 2A is a diagram illustrating an implementation of the user setting interface according to an embodiment of the invention. The user setting interface 210 has a dialogue box 211 which includes virtual images such as a virtual key BT1 and a virtual key BT2. The user setting interface 210 is displayed with the screen of the computer apparatus. The input action of the user instruction is performed by the user through any input interface such as mouse, keyboard, touch pad, finger or stylus. Taking FIG. 2A as an exemplary example, when a user wishes to start the ODD safety protection mode, the user can press the virtual key BT1 with the index of the mouse; on the contrary, when the user wishes to close the ODD safety protection mode, the user needs to press the virtual key BT2 with the index of the mouse.

Figure 2B:
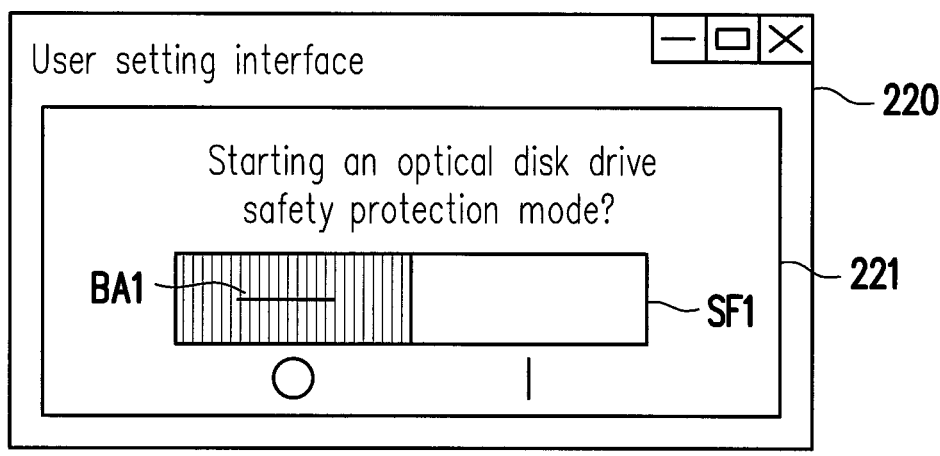
FIG. 2B is a diagram illustrating another implementation of the user setting interface according to an embodiment of the invention.

It should be noted that the implementation of the user setting interface 210 shown by FIG. 2A is an exemplary example only, and FIG. 2B is a diagram illustrating another implementation of the user setting interface according to an embodiment of the invention. In FIG. 2B, the dialogue box 221 of the user setting interface 220 includes virtual images such as a frame SF1 and a virtual key BT1 therein. In the implementation of FIG. 2B, the user can adjust the relative position of the virtual key BA1 in the frame SF1 to start or close the ODD safety protection mode by moving the virtual key BT1.

The user setting interface is certainly not restricted to the user setting interfaces 210 and 220 in FIGS. 2A and 2B, and any kind of user setting interfaces able to provide the user with selection actions for starting or closing the user setting interface 210 can be adopted in the invention.

Referring to FIG. 1 again, in step S130, it is decided whether or not the position state of the tray of the ODD can be changed according to that whether or not the ODD safety protection mode is started by the user and whether or not the computer apparatus is in the user mode. In more details, if the ODD safety protection mode is not started by the user, the action of controlling the ODD's tray by the computer apparatus is performed just according to the original setting of the computer apparatus; on the contrary, when the ODD safety protection mode is started and if the computer apparatus is in the user mode, it means the user is using the computer apparatus so that the ODD's tray is not restricted to be loaded or ejected although the ODD safety protection mode is started at the time, and the user can make the tray ejected from or loaded into the ODD depending on the requirement. Once the user has not used the computer apparatus for a period of time so that the computer apparatus temporarily logs out from the ODD safety protection mode, the position state of the tray of the ODD would be restricted by the started ODD safety protection mode so as to be unchangeable. That is, when the computer apparatus is not in the user mode, the ODD safety protection mode is started and the ODD's tray is ejected, the user is unable to change the ODD's tray into the loaded state by various ways such as pressing the button on the ODD or pushing the tray; on the contrary, if the computer apparatus is not in the user mode, the ODD safety protection mode is started and the ODD's tray is in the loaded state, the user is unable to change the ODD's tray into the ejected state by pressing the button on the ODD or other ways.

It should be further noted that when the computer apparatus is in the user mode, the user can execute an application to provide a user setting interface as well, through which the ODD safety protection mode is started. Next, the user can shut down the computer apparatus, but the computer apparatus at the time would commit that ODD safety protection mode has been started to memory. When other user boots the computer apparatus but the computer apparatus does not log in the user mode, the position state of the tray of the ODD is still restricted by the started ODD safety protection mode so as to fail changing the position state thereof.

It can be seen from the above mentioned, in the non-user login mode, since the position state of the tray of the ODD can be restricted by starting the ODD safety protection mode, the other parties are unable to insert an optic disk stored with a virus or a backdoor program into the ODD in advance, which can ensure the information safety in the computer apparatus.

In order to make the computer apparatus enter the user mode, it needs the user, after booting the computer apparatus, inputting a user login password on the computer apparatus. After verifying the user login password, the computer apparatus concludes whether the present user is the legal and eligible user or not. In short, in the ODD control method of the embodiment of the invention, in the case that by verifying the login password of the eligible user to control the ODD, the redundant password is unwanted.

Figure 3:
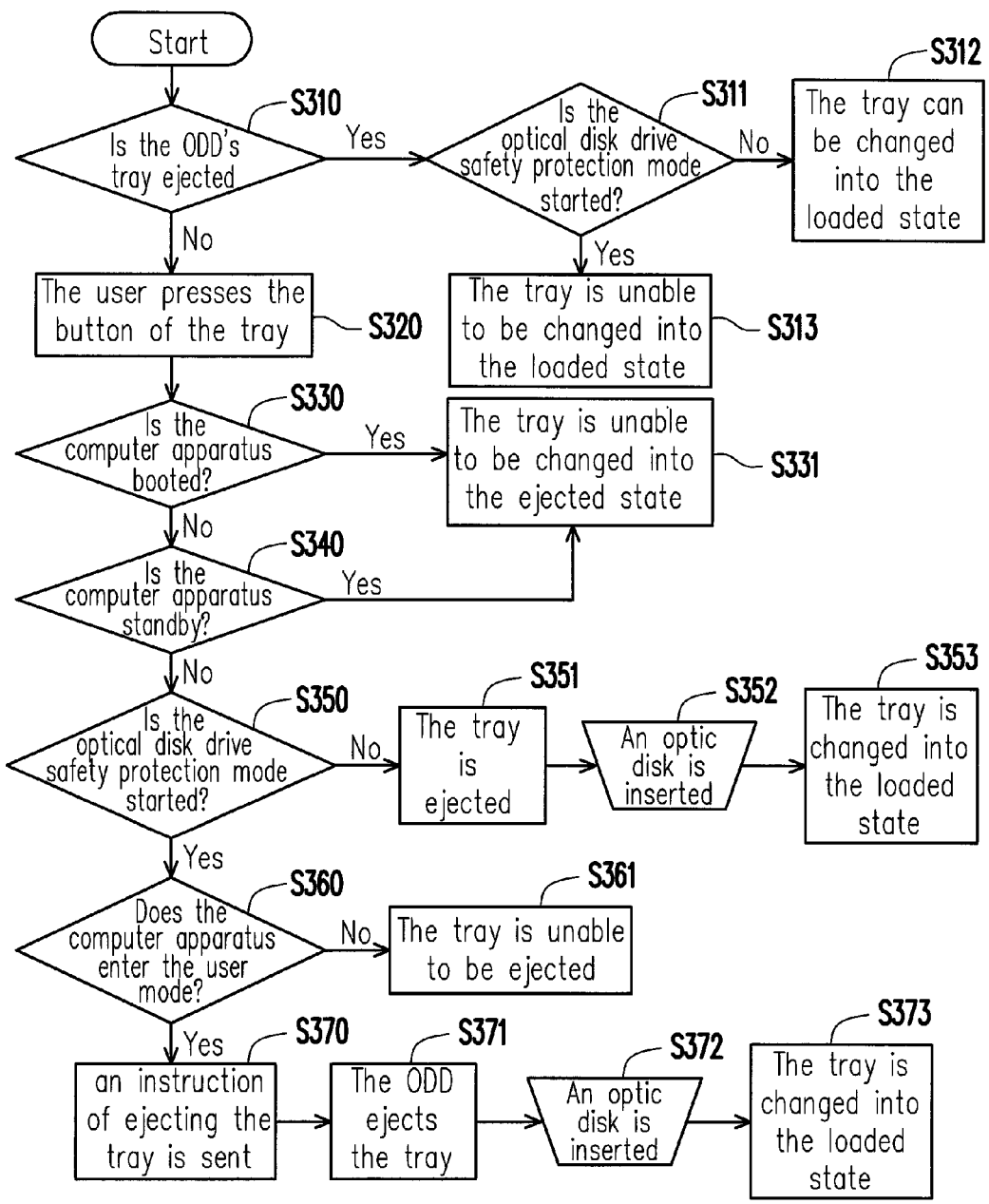
FIG. 3 is a flowchart of a control method for the ODD of a computer apparatus according to another embodiment of the invention.

FIG. 3 is a flowchart of a control method for the ODD of a computer apparatus according to another embodiment of the invention. Referring to FIG. 3, in step S310, it is judged whether or not the ODD's tray is ejected. If it is decided the ODD's tray is ejected, the procedure goes to step S311 to judge whether or not the ODD safety protection mode is started. If the ODD safety protection mode is not started, the procedure goes to step S312 where the ODD's tray is changed into the loaded state; if it is decided the ODD's tray is loaded in step S311, the procedure goes to step S313 where the ODD's tray is unable to be changed into the loaded state.

After the step S310, if it is decided the ODD's tray is loaded, not ejected, by the judging in the step S310, the procedure goes to step S320 where the user presses the button on the ODD to control the ODD, and then the procedure goes to step S330 to judge whether or not the computer apparatus is booted. If the computer apparatus is not booted at the time, the ODD's tray is unable to be ejected (step S311); on the contrary, if the computer apparatus is booted at the time, the procedure goes to step S340 to judge whether or not the computer apparatus enters a standby state; if the computer apparatus is in the standby state at the time, the ODD's tray is unable to be ejected (step S311); if the computer apparatus is not in the standby state at the time, the procedure goes to step S350.

In step S350, it is judged that whether or not the ODD safety protection mode is started. If the ODD safety protection mode is not started, the tray would be ejected in response to the action for the user to press the button in step S320 (step S351), then the procedure goes to step S352 to remind the user to place in an optic disk, followed by going to step 353 where the ODD is changed into the loaded state to allow the ODD accessing the optic disk placed in by the user.

After step S350, if the ODD safety protection mode is started, the procedure goes to step S360 to judge whether or not the computer apparatus has entered the user mode. If the computer apparatus is not in the user mode, the tray is banned to be ejected (step S361); on the contrary, when it is decided by judgement that the computer apparatus has entered the user mode in step S360, the computer apparatus sends out an instruction of ejecting the ODD in response to the action for the user to press the button in step S320 (step S370), followed by going to step S371 to make the ODD ejected from the tray. Then in step S372, the user places the optic disk on the tray, followed by going to step S373 to change the tray into the loaded state, so that the ODD can smoothly access the optic disk placed by the user.

Figure 4:
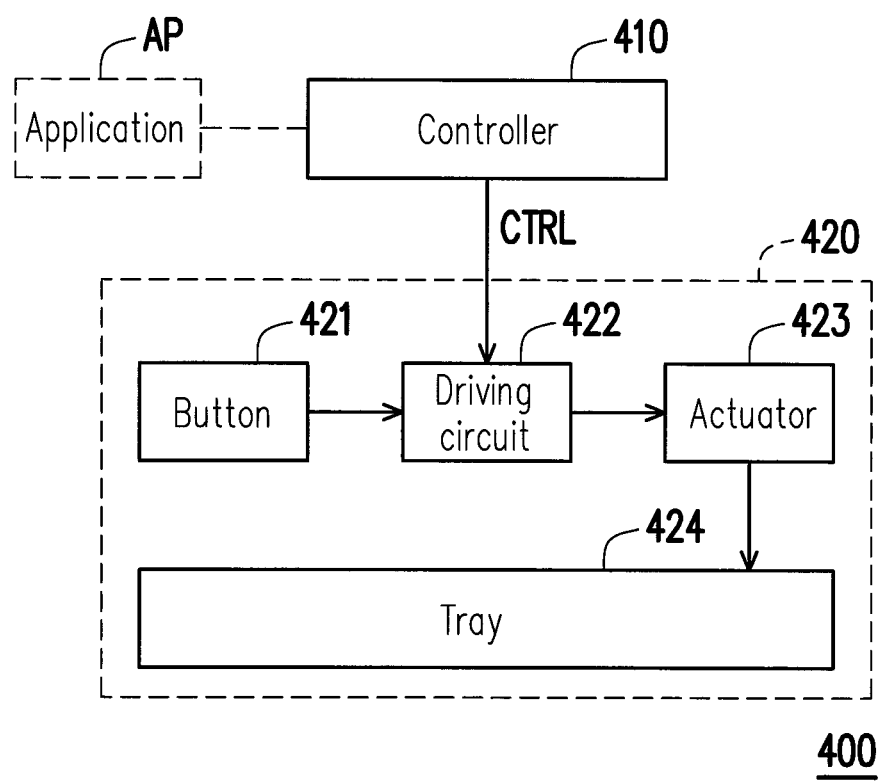
FIG. 4 is a diagram of a computer apparatus according to an embodiment of the invention.

FIG. 4 is a diagram of a computer apparatus according to an embodiment of the invention. Referring to FIG. 4, a computer apparatus 400 includes a controller 410 and an ODD 420. The controller 410 is coupled to the ODD 420 and can be a central processing unit (CPU) of the computer apparatus 400. The ODD 420 includes a button 421, a driving circuit 422, an actuator 423 and a tray 424. When the computer apparatus is in the user mode, the controller 410 executes an application AP to provide a user setting interface, through which the controller receives a user instruction to produce a control signal CTRL.

The driving circuit 422 is coupled to the controller 410 and receives the control signal CTRL provided by the controller 410. The driving circuit 422 is also coupled to the button 421, in which the button 421 is disposed on the ODD 420 to control the position state of the tray 424.

In the embodiment, the driving circuit 422 can block the function of controlling the position state of the tray 424 through pressing the button 421. In more details, when the control signal CTRL indicates the ODD safety protection mode has been started, and the computer apparatus 400 is in the non-user mode, the driving circuit 422 can disable the function of pressing the button 421 according to the control signal CTRL so as to forbid changing the position state of the tray 424.

When the position state of the tray 424 is going to be changed, the driving circuit 422 produces a driving signal and sends the driving signal to the actuator 423, through which the tray 424 is driven to change the position state of the tray.

The detailed implementation about the control way of the tray 424 can refer to the above-mentioned embodiments and the implementations, which is omitted to describe.

In summary, the invention provides the user setting interface to allow the user setting and starting the ODD safety protection mode, through starting the ODD safety protection mode, when the computer apparatus is in a non-user mode, the position state of the tray is frozen. In this way, a non-user of the computer apparatus is unable to input a virus or a backdoor program via the ODD, and thus, the information safety of the computer apparatus is effectively ensured.

What is claimed is:

1. A control method for the optical disk drive of a computer apparatus, comprising:
   providing a user setting interface through executing a safety mode setting application by the computer apparatus when the computer apparatus is in a user mode;
   receiving a user instruction through the user setting interface so as to start or close an optical disk drive safety protection mode; and
   deciding whether or not a position state of a tray of the optical disk drive can be changed according to that whether or not the optical disk drive safety protection mode is started and whether or not the computer apparatus is in the user mode.

2. The control method for the optical disk drive of a computer apparatus as claimed in claim 1, wherein the step of receiving the user instruction through the user setting interface so as to start or close the optical disk drive safety protection mode comprises:
   providing at least one virtual image through the user setting interface; and
   receiving the user instruction through the virtual image to start or close the optical disk drive safety protection mode.

3. The control method for the optical disk drive of a computer apparatus as claimed in claim 1, further comprising:
   receiving a user login password input by a user so that the computer apparatus enters the computer apparatus user mode.

4. The control method for the optical disk drive of a computer apparatus as claimed in claim 1, wherein the position state of the tray of the optical disk drive is adjustable when the computer apparatus enters the user mode.

5. The control method for the optical disk drive of a computer apparatus as claimed in claim 1, wherein the position state of the tray of the optical disk drive is unable to be changed when the computer apparatus does not enter the user mode and the optical disk drive safety protection mode is started.

6. The control method for the optical disk drive of a computer apparatus as claimed in claim 1, wherein the position state of the tray of the optical disk drive is able to be changed when the computer apparatus does not enter the user mode and the optical disk drive safety protection mode is closed.

7. The control method for the optical disk drive of a computer apparatus as claimed in claim 1, wherein the position state comprises that the tray is loaded and the tray is ejected.

8. A computer apparatus, comprising:
   an optical disk drive, having a tray; and
   a controller, coupled to the optical disk drive, wherein when the computer apparatus is in a user mode, the controller provides a user setting interface through executing a safety mode setting application and receives a user instruction through the user setting interface so as to start or close an optical disk drive safety protection mode,
   wherein the controller produces a control signal according to that whether or not the optical disk drive safety protection mode is started and whether or not the computer apparatus is in the user mode, and the optical disk drive decides whether or not a position state of the tray of the optical disk drive can be changed according to the control signal.

9. The computer apparatus as claimed in claim 8, wherein the optical disk drive comprises:
   a driving circuit, coupled to the controller, receiving the control signal and judging whether or not to produce a driving signal according to the control signal; and
   an actuator, coupled to the driving circuit and the tray, receiving the driving signal and changing the position state of the tray according to the driving signal.

10. The computer apparatus as claimed in claim 8, wherein the controller provides at least one virtual image through the user setting interface and receives the user instruction to start or close the optical disk drive safety protection mode through the virtual image.

11. The computer apparatus as claimed in claim 8, wherein the controller further receives a user login password input by a user to make the computer apparatus enter the user mode.

12. The computer apparatus as claimed in claim 8, wherein when the computer apparatus enters the user mode, the controller produces the control signal to make the position state of the tray of the computer apparatus changeable.

13. The computer apparatus as claimed in claim 8, wherein when the computer apparatus does not enter the user mode and the optical disk drive safety protection mode is started, the controller produces the control signal to make the position state of the tray of the optical disk drive unchangeable.

14. The computer apparatus as claimed in claim 8, wherein the computer apparatus does not enter the user mode and the optical disk drive safety protection mode is closed, the controller produces the control signal to make the position state of the tray of the optical disk drive changeable.

* * * * *